(12) United States Patent
Smith et al.

(10) Patent No.: US 11,214,114 B2
(45) Date of Patent: Jan. 4, 2022

(54) ELECTRIC VEHICLE THERMAL MANAGEMENT SYSTEM

(71) Applicant: Ford Global Technologies, LLC, Dearborn, MI (US)

(72) Inventors: Mark G. Smith, Canton, MI (US); William Samuel Schwartz, Pleasant Ridge, MI (US); Kenneth J. Jackson, Dearborn, MI (US); David Fabricatore, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 16/103,008

(22) Filed: Aug. 14, 2018

(65) Prior Publication Data

US 2018/0354339 A1 Dec. 13, 2018

Related U.S. Application Data

(63) Continuation of application No. 13/757,291, filed on Feb. 1, 2013, now Pat. No. 10,046,617.

(51) Int. Cl.
*B60H 1/00* (2006.01)
*B60H 1/14* (2006.01)

(52) U.S. Cl.
CPC ..... *B60H 1/00278* (2013.01); *B60H 1/00392* (2013.01); *B60H 1/143* (2013.01); *B60H 2001/00307* (2013.01)

(58) Field of Classification Search
CPC ............ B60H 1/00642; B60H 1/00278; B60H 1/00392; B60H 1/143; B60H 1/00314; B60H 1/00885; B60H 1/06; B60H 1/02; B60H 1/034; B60H 1/2215; B60H 1/2218; B60H 2001/00307; B60H 2001/00928; B60H 2001/00949; B60H 2001/00942
See application file for complete search history.

(56) References Cited

U.S. PATENT DOCUMENTS

| 5,524,681 | A | 6/1996 | Davies et al. |
|---|---|---|---|
| 5,531,285 | A | 7/1996 | Green |
| 6,138,466 | A | 10/2000 | Lake et al. |
| 6,213,233 | B1 | 4/2001 | Sonntag et al. |
| 6,357,541 | B1 | 3/2002 | Matsuda et al. |

(Continued)

FOREIGN PATENT DOCUMENTS

| GB | 2341830 A | 3/2000 |
|---|---|---|
| JP | 2002352866 A | 12/2002 |
| JP | 2002352867 A | 12/2002 |

OTHER PUBLICATIONS

Lang, G. et al., "Principal Aspects and Simulation of a Hybrid Demonstrator Vehicle's Cooling System," SAE Technical Paper, 2007-01-3483, 2007, 8 pages.

*Primary Examiner* — Travis Ruby
(74) *Attorney, Agent, or Firm* — David B. Kelley; Brooks Kushman P.C.

(57) ABSTRACT

A traction battery thermal management system is provided. The thermal management system includes a battery loop for regulating the traction battery temperature. A motor loop is provided for regulating a motor temperature. The thermal management system also includes a radiator. A radiator valve selectively controls fluid flow through the radiator. A battery valve selectively couples the battery loop and the motor loops. The battery loop, the motor loop are in fluid communication and arranged in parallel to be cooled by the radiator.

11 Claims, 4 Drawing Sheets

(56) References Cited

U.S. PATENT DOCUMENTS

| | | |
|---|---|---|
| 6,601,545 B1 | 8/2003 | Hohl |
| 6,616,059 B2 | 9/2003 | Sabhapathy et al. |
| 2001/0040061 A1 | 11/2001 | Matuda et al. |
| 2002/0184908 A1 | 12/2002 | Brotz et al. |
| 2005/0000473 A1 | 1/2005 | Ap et al. |
| 2008/0028768 A1 | 2/2008 | Goenka |
| 2008/0251235 A1 | 10/2008 | Zhou |
| 2009/0020620 A1 | 1/2009 | Douarre |
| 2009/0139781 A1 | 6/2009 | Straubel |
| 2009/0280395 A1 | 11/2009 | Nemesh et al. |
| 2010/0084112 A1 | 4/2010 | Piccard et al. |
| 2010/0293966 A1 | 11/2010 | Yokomachi et al. |
| 2011/0091750 A1 | 4/2011 | Claypole et al. |
| 2012/0297809 A1 | 11/2012 | Carpenter |

| Cabin Conditioning Valve Flow ←E | | Cabin Conditioning Valve Flow →F | |
|---|---|---|---|
| Battery Valve Flow ↑C | Battery Valve Flow ↓D | Battery Valve Flow ↑C | Battery Valve Flow ↓D |
| Radiator Cooling Mode (Figs. 2 & 3) | Fully Isolated Mode (Fig. 4) | Fully Blended Mode (Fig. 5) | Battery Isolated Mode (Fig. 6) | Radiator Valve Flow ←A |
| Warming Mode (Fig. 7) | Fully Isolated Mode (Fig. 4) | | | Radiator Valve Flow ↓B |

Fig. 8

ELECTRIC VEHICLE THERMAL MANAGEMENT SYSTEM

CROSS-REFERENCE TO RELATED APPLICATION

This application is a continuation of U.S. application Ser. No. 13/757,291 filed Feb. 1, 2013, issued as U.S. Pat. No. 10,046,617 on Aug. 14, 2018, the disclosure of which is incorporated in its entirety by reference herein.

TECHNICAL FIELD

The present disclosure relates to a thermal management system in an electric vehicle.

BACKGROUND

Vehicles such as battery-electric vehicles (BEVs), plug-in electric vehicles (PHEVs) or hybrid-electric vehicles (HEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging.

The vehicles with batteries may include a cooling system to provide temperature control of the battery, thereby maintaining the charging capacity and extending the battery life, and improving other battery performance characteristics.

SUMMARY

In one embodiment, an electric vehicle thermal management system is provided. The thermal management system includes a battery loop for regulating temperature of a traction battery. The battery loop includes a chiller adapted to cool fluid in the battery loop and a battery pump for circulating fluid in the battery loop. A motor loop is provided for regulating temperature of a traction motor and is in fluid communication with the battery loop. The motor loop includes a motor pump for circulating fluid in the motor loop. The motor pump and the battery pump are arranged in parallel. A radiator is n fluid communication with the battery loop and motor loop. A radiator valve selectively controls fluid flow through the radiator. When the radiator valve is in a first position, fluid flows through the radiator. When the radiator valve is in a second position, fluid bypasses the radiator. A battery valve selectively couples the battery loop and the motor loop. When the battery valve is in a first position, fluid flows in parallel through the battery loop and the motor loop. The traction battery is cooled by the radiator without the chiller when both the radiator valve and the battery valve are set to the first position, respectively.

In another embodiment, a traction battery thermal management system is provided. The thermal management system includes a battery loop for regulating the traction battery temperature. A motor loop is provided for regulating a motor temperature. The thermal management system also includes a radiator. A radiator valve selectively controls fluid flow through the radiator. A battery valve selectively couples the battery loop and the motor loops. The battery loop, the motor loop are in fluid communication and arranged in parallel to be cooled by the radiator.

In one other embodiment, a method of thermally managing a electric vehicle is provided. The method includes commanding a radiator valve to a first position to allow fluid flow through the radiator. A battery valve is commanded to a first position to allow fluid flow in parallel through a battery loop and a motor loop. The radiator cools the battery and the traction motor in parallel.

BRIEF DESCRIPTION OF THE DRAWINGS

FIG. 8 is a chart illustrating the operating modes of the thermal management system of FIG. 2.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
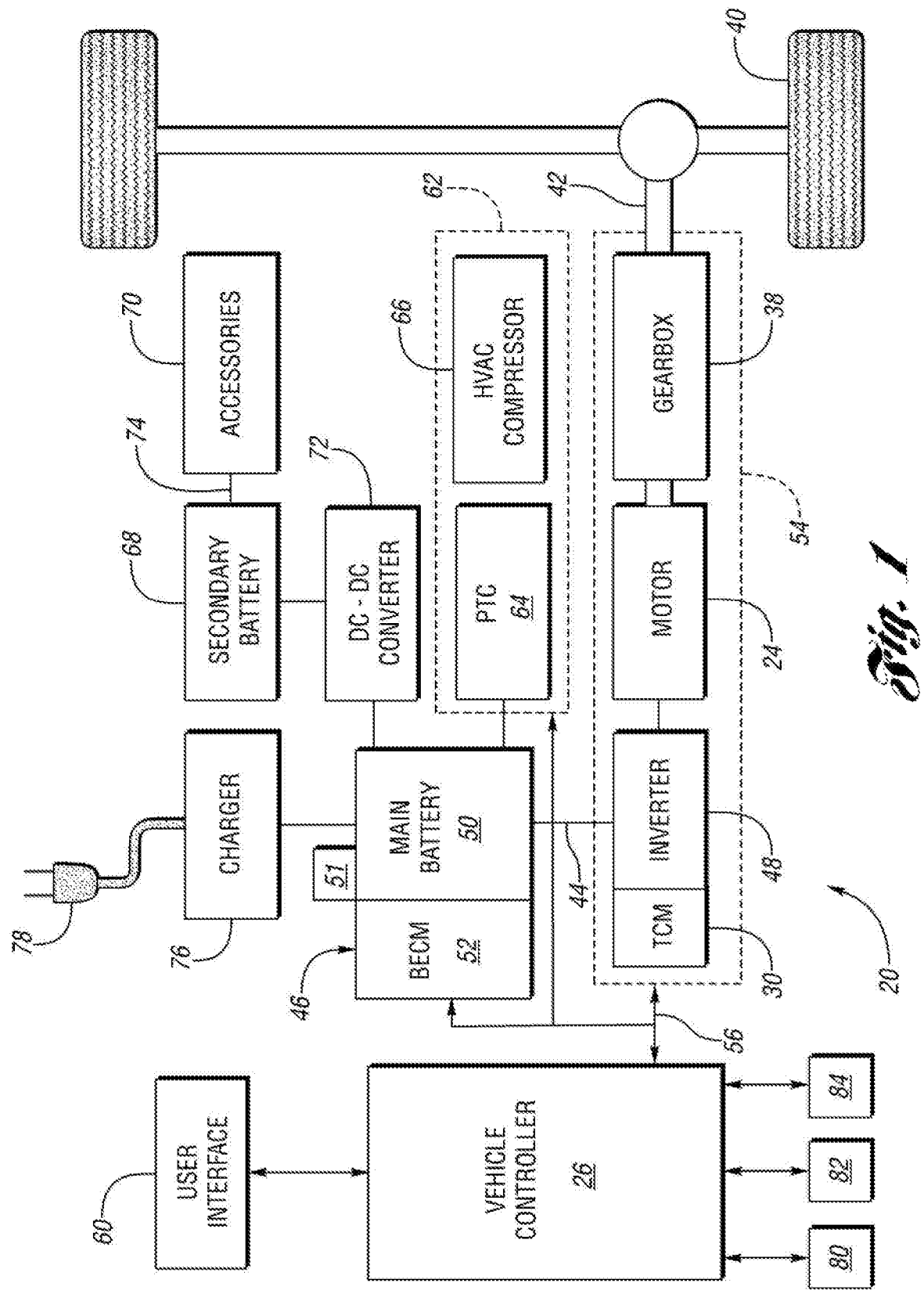
FIG. 1 is a schematic of a battery electric vehicle according to an embodiment of the present disclosure.

With reference to FIG. 1, an electric vehicle 20, such as a battery electric vehicle (BEV), is illustrated in accordance with one or more embodiments. FIG. 1 represents only one type of BEV architecture, and is not intended to be limiting. The present disclosure may be applied to any suitable BEV.

The vehicle 20, or BEV, is an all-electric vehicle propelled through electric power, such as by an electric motor 24, and without assistance from an internal combustion engine. The motor 24 receives electrical power and provides mechanical rotational output power. The motor 24 is connected to a gearbox 38 for adjusting the output torque and speed of the motor 24 by a predetermined gear ratio. The gearbox 38 is connected to a set of drive wheels 40 by an output shaft 42. Other embodiments of the vehicle 20 include multiple motors (not shown) for propelling the vehicle 20. The motor 24 may also function as a generator for converting mechanical power into electrical power. A high voltage bus 44 electrically connects the motor 24 to an energy storage system 46 through an inverter 48.

The energy storage system 46 includes a main battery 50 and a battery energy control module (BECM) 52, according to one or more embodiments. The BECM is adapted to connect the vehicle 20 to an electrical source 78, such as a 110V source or 220V source, and to send the current received to the battery 50 or the transmission control system 30.

The main battery 50 is a high voltage battery, or traction battery, that may output electrical power to operate the motor 24. The main battery 50 is a battery pack made up of one or more battery modules. Each battery module may contain one battery cell or a plurality of battery cells. The battery cells are heated and cooled using a fluid coolant system, air coolant system, or other coolant method as is known in the art. The BECM 52 acts as a controller for the main battery 50. The BECM 52 also includes an electronic monitoring system that manages temperature and state of charge of each of the battery cells. The battery 50 has at least one temperature sensor 51, such as a thermistor or the like. The sensor 51 is in communication with the BECM 52 to provide temperature data regarding the battery 50.

The motor 24, the transmission control module (TCM) 30, the gearbox 38, and the inverter 48 are collectively referred to as a transmission 54. The vehicle controller 26 communicates with the transmission 54, for coordinating the function of the transmission 54 with other vehicle systems. The controller 26, BECM 52, and TCM 30 are illustrated as separate controller modules. The control system for the vehicle 20 may include any number of controllers, and may be integrated into a single controller, or have various modules. Some or all of the controllers may be connected by a controller area network (CAN) or other system. The control system may be configured to control operation of the various components of the transmission 54 and the battery 50 under any of a number of different conditions, including in a way that thermally manages the temperature in the battery 50 and the vehicle cabin or passenger compartment, and for charging and discharging operations of the battery 50.

The TCM 30 is configured to control specific components within the transmission 54, such as the motor 24 and/or the inverter 48. The vehicle controller 26 monitors the temperature of the motor 24 and receives a throttle request (or desired motor torque request) from the driver. Using this information the vehicle controller 26 provides a motor torque request to the TCM 30. The TCM 30 and the inverter 48 convert the direct current (DC) voltage supply by the main battery 50 into signals that are used to control the motor 24 in response to the motor torque request.

The vehicle controller 26 provides information to the driver through a user interface 60. The user interface 60 may include features that permit a user to enter requirements or desired operating or charging parameters of the vehicle, or other vehicle operating parameters into the controller 26. The user interface 60 may include a touch screen interface, a wireless connection to a remote station, such as a mobile device or computer, and other input interfaces as are known in the art. The vehicle controller 26 also receives input signals that are indicative of current operating conditions of vehicle systems. For instance, the vehicle controller 26 may receive input signals from the BECM 52 that represent battery 50 conditions, and input signals from the transmission 54, that represent motor 24 and inverter 48 conditions. The vehicle controller 26 provides output to the user interface 60, such as a motor status or charge level status, which is conveyed visually to the driver. The controller 26 arbitrates between the various user requests to thermally manage the vehicle 20 both on-charge and while operating.

The vehicle 20 includes a climate control system 62 for heating and cooling various vehicle components. The climate control system 62 includes a high voltage electric heater 64 and a high voltage electric HVAC compressor 66, according to one or more embodiments. The heater 64 is used to heat coolant which circulates through the heater core and the compressor 66 is used to cool the refrigerant which cools the cabin and the battery in some situations. Both the heater 64 and the compressor 66 may draw electrical energy directly from the main battery 50. The climate control system 62 may include a controller (not shown) for communicating with the vehicle controller 26 over the CAN bus 56 or may be integrated into the controller 26. The on/off status of the climate control system 62 is communicated to the vehicle controller 26, and can be based on, for example, the status of an operator actuated switch, or the automatic control of the climate control system 62 based on related functions, such as window defrost. The climate control system 62 may be connected to the user interface 60 to permit a user to set a temperature for the cabin, or pre-program a temperature for a future operating cycle of the vehicle.

The vehicle 20 includes a secondary battery 68, such as a 12-volt battery, according to one embodiment. The secondary battery 68 may be used to power various vehicle accessories such as headlights and the like, which are collectively referred to herein as accessories 70. A DC-to-DC converter 72 may be electrically interposed disposed between the main battery 50 and the secondary battery 68. The DC-to-DC converter 72 adjusts, or "steps down" the voltage level to allow the main battery 50 to charge the secondary battery 68. A low voltage bus 74 electrically connects the DC-to-DC converter 72 to the secondary battery 68 and the accessories 70.

The vehicle 20 includes an AC charger 76 for charging the main battery 50. An electrical connector 78 connects the AC charger 76 to an external power supply (not shown) for receiving AC power. The AC charger 76 includes power electronics used to convert, or "rectify" the AC power received from the external power supply to DC power for charging the main battery 50. The AC charger 76 is configured to accommodate one or more conventional voltage sources from the external power supply (e.g., 110 volt, 220 volt2, etc.) In one or more embodiments, the external power supply includes a device that harnesses renewable energy, such as a photovoltaic (PV) solar panel, or a wind turbine (not shown).

Also shown in FIG. 1 are simplified schematic representations of a driver controls system 80, a power steering system 82, and a navigation system 84. The driver controls system 80 includes braking, acceleration and gear selection (shifting) systems. The braking system includes a brake pedal, position sensors, pressure sensors, or some combination thereof, as well as a mechanical connection to the vehicle wheels, such as the primary drive wheels 40, to effect friction braking. The braking system may also be configured for regenerative braking, wherein braking energy may be captured and stored as electrical energy in the main battery 50. The acceleration system includes an accelerator pedal having one or more sensors, which, like the sensors in the braking system, provides information such as the throttle request to the vehicle controller 26. The gear selection system includes a shifter for manually selecting a gear setting of the gearbox 38. The gear selection system may include a shift position sensor for providing shifter selection information (e.g. park, drive, neutral) to the vehicle controller 26.

The navigation system 84 may include a navigation display, a global positioning system (GPS) unit, a navigation controller and inputs (all not shown) for receiving destination information or other data from a driver. The navigation system may be integrated with the user interface 60 in some embodiments. The navigation system 84 may also communicate distance and/or location information associated with the vehicle 20, its target destinations, or other relevant GPS waypoints.

Figure 2:
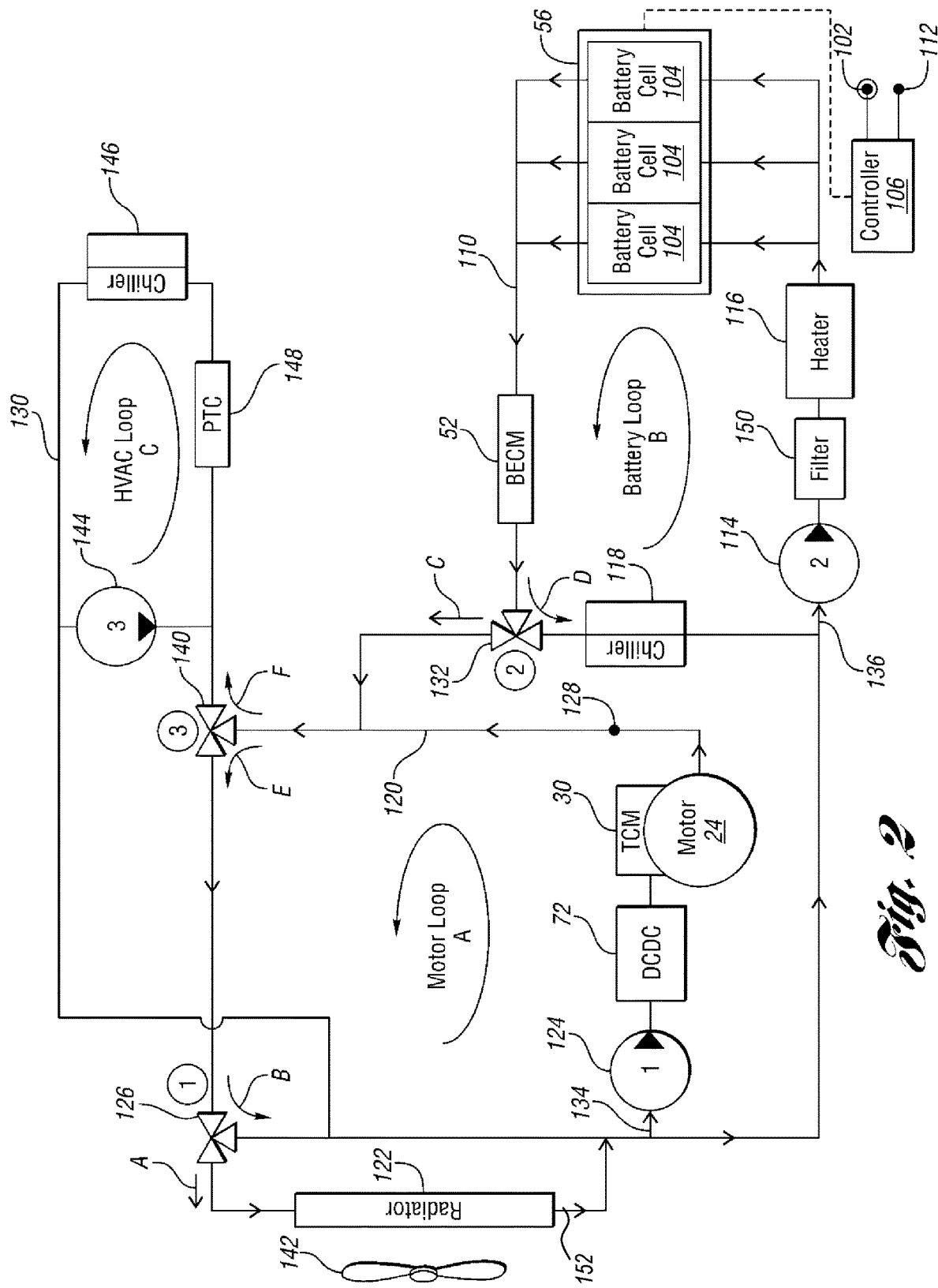
FIG. 2 is a schematic of a thermal management system illustrating one operating mode according to an embodiment of the present disclosure.
Figure 4:
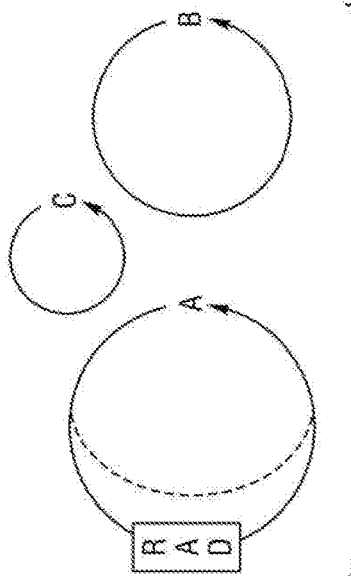
FIG. 4 is a simplified schematic of the thermal management system of FIG. 2 and another operating mode according to an embodiment of the present disclosure.

FIG. 2 illustrates a plurality of integrated thermal circuits or loops which form a thermal management system 100 for use with vehicle 20 as shown in FIG. 1. The thermal management system 100 includes a battery thermal loop 110, a motor loop 120, and a cabin loop 130.

The thermal management system 100 includes several valves for selectively connecting the loops in different operating modes. The flow arrows illustrated in FIG. 2 show an operating mode that allows a radiator 122 to cool the traction motor 124 of the motor loop and the battery 50 in the battery thermal loop 110. The motor loop 120 and the battery thermal loop 110 are arrange in parallel in order to enable the radiator cooling mode to provide cooling to both the motor 24 and battery 50. Additional operation modes will be described in FIGS. 3-7 with reference back to FIG. 2.

The battery thermal loop 110 may heat and cool the battery 50. The battery 50 is made up of one or more battery packs, and a battery 50 having one pack is shown in FIG. 2. Each battery pack may have multiple cells 104. The battery 50 in FIG. 2 is illustrated having three cells 104, although any number of cells may be used with a battery 50 as is known in the art. The battery cells 104 are separated by heat exchanger fins, which have narrow cooling channels through which a fluid flows to regulate the temperature of each of the battery cells 104.

The controller 106, which may be a vehicle controller in communication with or integrated with the battery control module, monitors the battery 50 to determine the state of charge and capacity of the battery 50. Each cell 104 may have an associated temperature sensor that is configured to measure the cell temperature. The temperature sensor is in communication with the controller 106 such that the controller 106 also monitors the battery temperature by monitoring each batter cell 104 temperature. The controller 106 determines the temperature of the battery 50 by measuring or estimating the temperatures of the various battery cells 104.

The controller 106 is also in communication with an ambient temperature sensor 102 on the vehicle. The ambient temperature sensor 102 is configured to measure the temperature of the ambient environment. A cabin temperature sensor 112 is also in communication with the controller 106 and measures the temperature of the vehicle passenger cabin to provide feedback for the HVAC system for climate control of the cabin.

The battery 50 temperature may be actively regulated using the battery thermal loop 110 that is controlled by controller 106. The temperature of the battery 50 and of each cell 104 determines the amount of charge that the battery 50 can accept and the amount of charge that can be used when stored in the battery 50.

The battery thermal loop 110 thermally manages the battery 50 to regulate cell 104 temperatures in order to maintain the battery 50 useful life, permit a proper charge, and meet vehicle performance attributes. The battery thermal loop 110 provides active heating or active cooling to the battery cells 104 via convective heat transfer between the cells 104 and the heat exchange fluid. The battery thermal loop 110 may be integrated into a vehicle thermal system having both climate control heating and cooling elements and powertrain cooling elements.

The battery thermal loop 110 contains a fluid that circulates through the cooling channels adjacent to the cells 104 in the battery to heat or cool the battery 50 using primarily convective heat transfer. The fluid is a liquid coolant, such as glycol or water or combination thereof that aids in regulating the temperature of the battery cells 104. A pump 114 circulates fluid in the battery thermal loop 110. A heating element 116 acts as a thermal source for the fluid to heat the fluid and in turn to actively heat the battery 50. The heating element 116 may be a heat exchanger with another thermal system in the vehicle to recover waste heat, or may be a stand-alone heater, such as an electrically powered heater including a positive thermal coefficient (PTC) heater.

The battery thermal loop 110 also has a chiller element 118, or thermal sink that cools the fluid and which in turn actively cools the battery 50. The chiller element 118 may be part of a vapor compression or absorption cycle, a heat exchanger with another element in the vehicle thermal systems, or other thermal sink as is known in the art. Heat exchangers in the chiller element 118 may be co-flow, counter-flow or other heat exchangers as are known in the art to appropriately heat or cool the fluid in the battery thermal loop 110.

The battery thermal loop 110 also includes the BECM 52. The BECM 52 may also generate heat during use may also require cooling to maintain the BECM 52 within a suitable temperature range. The battery thermal loop 110 may also flow through the battery charger to actively heat or cool the BECM 52 and charging components.

To protect the battery cells 104 from contamination in the thermal management system 100, the battery thermal loop 110 also includes a filter 150. The filter 150 is disposed upstream of the battery 50 in order to filter debris. Since coolant circulates throughout the entire thermal system 100, the filter 150 filters debris from the motor loop 120 or the cabin loop 130 before the debris gets to the narrow cooling channels in the battery cells 104.

The motor loop 120 regulates the temperature of the traction motor 24. The motor loop 120 also regulates the temperature for any thermal load from the transmission control module 30 and the DC/DC converter 72. The motor loop 120 also includes a motor pump 124 positioned to circulate the heat exchange fluid through the motor loop 120. The motor pump 124 may located in any acceptable position along the motor loop 120.

The thermal management system also includes the radiator 122. A radiator bypass valve 126 selectively controls fluid flow through the radiator 122. In a first position, all of the heat exchange fluid flow is directed in the direction A and through the radiator 122. Conversely, when the radiator bypass valve 126 is in the second position, all of the heat exchange fluid flow is directed in the direction B. In the direction B, the fluid bypasses the radiator 122 when possible, such as when the heat exchange fluid is below a threshold temperature.

A battery valve 132 is provided to selectively couple the battery thermal loop 110 and the motor loop 120. In a first position, the heat exchange fluid is directed in the direction C to effectively couple the battery thermal loop 110 to the motor loop 120 in parallel. When the radiator bypass valve 126 is in the first position and fluid flows in the direction A and the battery valve 136 is also in the first position so fluid flows in the direction C, flow through the radiator 122 is arranged in parallel to the motor loop 120 and the battery thermal loop 110. Also, when the radiator bypass valve 126 is in the first position and fluid flows in the direction A and the battery valve is also in the first position so fluid flows in parallel flows through the motor loop 120 and the battery thermal loop 110 and is combined and sent through the radiator. A motor loop inlet 134 is arranged in parallel to a battery loop inlet 136. Likewise, the battery pump 114 is arranged in parallel to the motor pump 124. At an outlet 152 of the radiator 122, the motor loop inlet 134 and the battery loop inlet 136 are arranged in parallel so that fluid exiting the radiator 122 enters both the battery loop 110 and the motor loop 120 in parallel.

Arranging the motor loop 120 and the battery thermal loop 110 in parallel provides advantages. In a parallel system, the pressure drop across the two loops between the two points where the parallel loops connect (inlet and outlet) is the same. Additionally, two parallel loops see the same inlet temperature coming from the radiator as the two loops combine before entering the radiator and split up after it. By only providing the flow required within each parallel leg for the components therein, a reduced pump power is realized. Therefore, each pump may be smaller and use less energy. In contrast, when loops are tied in series with one another, the component with the largest flow rate would determine the overall system flow rate forcing higher than necessary flows through but the component with the largest flow requirement. These higher than necessary flows result in excessive pump power consumption and, which decreases fuel efficiency and/or decreases the electric range of the vehicle by the battery. Also, if the loops are arranged in series, the radiator cooling mode is ineffective because the motor loop 120 would feed already warmed heat exchange to the battery thermal loop 110. Additionally, in a series configuration, each component down the line sees a higher temperature than the one before it due to the heating of the fluid upstream. This can result in excessive temperatures. Of particular importance, the parallel configuration illustrated, compared to a series configuration, provides a lower temperature at the battery loop inlet 136 when cooling is provided from the radiator 122. The traction battery has a low temperature requirement. In a series arrangement, fluid that has already been heated by the motor loop does not provide adequate cooling to satisfy the temperature requirements of the battery under most conditions. In a parallel arrangement, each loop sees the same inlet temperature, and although upstream heating occurs within each loop, overall temperatures are lower which provides more desirable cooling for the traction battery as well as other components in the system.

A third valve, a cabin valve 140, or HVAC valve, is provided for selectively providing heat exchanger fluid to the cabin loop 130. In a first position, the cabin valve 140 is positioned in to direct flow in the direction E towards the motor loop 120, and generally isolates the cabin loop 130. In a second position the cabin valve 140 directs fluid flow in the direction F which allows fluid to enter the cabin loop 130. If the motor loop 120 has warmed the fluid sufficiently, this heated fluid may provide some relief to the fluid heater 148, such as a PTC, by reducing the energy it must consume to provide fluid of an appropriate temperature for use in cabin heating via the heater core 146 in the cabin loop 156.

Figure 3:
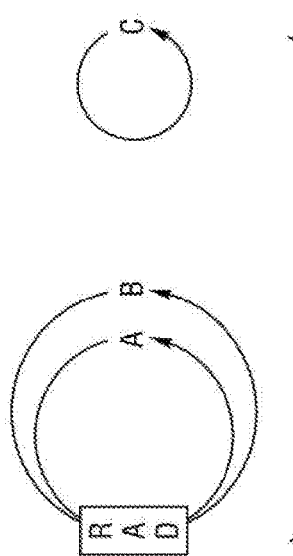
FIG. 3 is a simplified schematic of the thermal management system and the operating mode of FIG. 2.

The fluid flow indicated in FIG. 2, and more simply in FIG. 3, shows an efficient cooling mode of the thermal management system 100. This cooling mode allows the radiator 122 and a low voltage fan 142 to provide cooling of the thermal loads in the motor loop 120 and the battery thermal loop 110. When the battery valve 132 is set to the first position to direct flow in the direction C so that the battery loop 110 and the motor loop 120 are combined, the battery loop 110 is arranged in parallel with the motor loop 120. The radiator 122 is arranged in series with both the battery loop 110 and the motor loop 120. With the battery thermal loop 110 arranged in series to the radiator 122, the radiator 122 provides cooling to the battery thermal loop 110, including the traction battery 50 and battery cells 104, without having to turn on the chiller 118. It is contemplated that the radiator 122 can provide cooling to the battery thermal loop 110 over a large ambient temperature range from 0 degrees Celsius to 25 degrees Celsius, for example. The radiator 122 and low voltage fan 142 consume less energy than running the chiller 118, which increases fuel efficiency and/or increases the electric range of the vehicle by the battery 50. Using the radiator 122 to provide cooling to the traction battery 50 also improves the robustness and durability of the thermal management system 100 since the chiller 118 is used less often, and provides a battery cooling option if the chiller 118 becomes inoperable for some reason.

When the battery valve 132 is moved to a second position, the heat exchange fluid is direction in the direction D to substantially isolate the battery thermal loop 110 from the motor loop 120. The cabin valve 140 is in the first position to direct flow in the direction E to also isolate the cabin loop 130. As shown in the simplified schematic in FIG. 4, the thermal management system 100 is in an isolated mode where each of the thermal loops is isolated from each other. The isolated mode may be used above a threshold ambient temperature, for example above 25 degrees Celsius, when the radiator 122 may no longer be able to cool the battery 50 sufficiently. Above the threshold temperature, battery cooling may be handled through the chiller 118 and air conditioning system. The chiller 118 cools the battery loop 110 by providing heat exchange between the fluid in the battery loop 110 and the sub-ambient temperature refrigerant. In this mode, there may be no cabin heating required, and so the cabin loop is separated from the thermal management system 100 and shut off.

In the isolated mode, the radiator bypass valve 126 may change to direct flow in the direction A or the direction B, to provide a thermostat-effect depending on temperature conditions of the motor loop 120. A temperature sensor 128 may be provided for determining the temperature of heat exchange fluid at a selected point in the motor loop 120. As illustrated, the temperature sensor 128 may be positioned downstream from all the thermal loads such as the motor 24, the TCM 30 and the DC/DC converter 72 in order to record the highest temperature of the heat exchange fluid. Based on the temperature determined by the temperature sensor 128, a controller, such as controller 106, can determine whether or not to position the radiator bypass valve 126 in the first position where flow is directed in the direction A the radiator 122, or in the second position when fluid flow bypasses the radiator 122 in the direction B. It may also be advantageous provide the temperature sensor 128 adjusted the inlet 134 since most component coolant temperature requirements may be based on inlet coolant temperature.

The cabin loop 130 may include the HVAC system for the vehicle, or climate control system for the vehicle passenger cabin. As illustrated, the cabin loop 130 has a fluid loop with a pump 144 and a heater core element 146 to use heated fluid to provide heated air to the cabin vents.

The battery thermal loop 110, the motor loop 120 and the cabin loop 130, are three separate but integrated thermal loops. The loops 110, 120 and 130 can close the three separate valves and run independently from each other using three separate pumps. Or the loops 110, 120 and 130 may be selectively blended so that waste heat from the motor 24 can be used to heat the cabin or heat the battery 50, for example. The multiple integrated thermal loop architecture minimizes the necessary components in each of the loops 110, 120 and 130 if each loop were separate which allows for cost and weight savings, for example.

Figure 5:
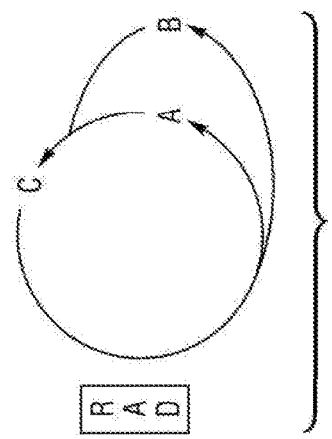
FIG. 5 is a simplified schematic of the thermal management system of FIG. 2 and another operating mode according to an embodiment of the present disclosure.

For example, FIG. 5 illustrates a fully blended mode where all of the loops 110, 120 and 130 are connected and the heat exchanger fluid circulates through all of the loops. In the fully blended mode, the battery valve 132 is set to the first position to direct flow in the direction C and the cabin valve 140 is set to the second position to direct flow in the direction F. In the fully blended mode, the motor loop 120 and battery loop 110 are in parallel and the cabin loop 130 is connected in series to the combined flows of the motor loop 120 and the battery loop. The blended mode may be used during a narrow temperature range when waste heat from the motor loop 120 and battery thermal loop 110 can be used to heat the passenger cabin of the vehicle without the need for the heater 148.

In the fully blended mode, the radiator valve 126 is bypassed and therefore does not affect the function of the thermal management system 100.

Figure 6:
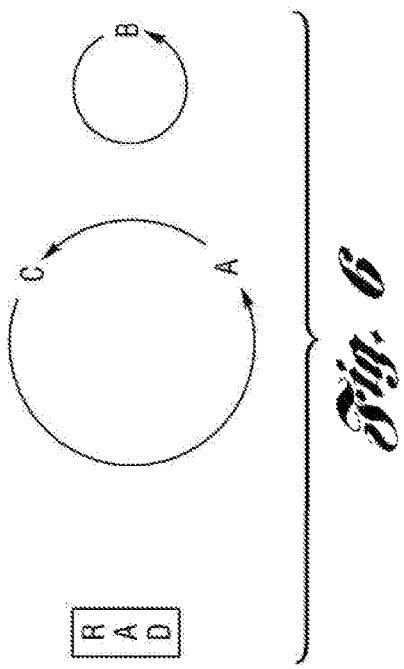
FIG. 6 is a simplified schematic of the thermal management system of FIG. 2 and another operating mode according to an embodiment of the present disclosure.

FIG. 6 illustrates a mode where the battery thermal loop 110 is isolated but the motor loop 120 and the cabin loop 130 are blended. In the battery isolated mode, the battery valve 132 is set to the second position to direct flow in the direction D to substantially isolate the battery thermal loop 110. The cabin valve 140 is set to the second position to direct flow in the direction F so that flow from the motor loop 120 is directed to the cabin loop 130 so the motor loop 120 and the cabin loop 130 are connected in series. The battery isolated mode in FIG. 6 may be used when the temperature of the battery 50 is in a target range. By isolating the battery thermal loop 110, the temperature of the battery 50 is regulated with the heating element 116 and cooled using the chiller 118.

The controller 106 may command the battery valve to the second position and the battery isolated mode in FIG. 6 when the battery temperature sensor detects a target battery temperature range between 10 degrees Celsius and 45 degrees Celsius, for example. The target range may vary depending on the ambient temperature or driver usage, for example. In the isolated mode, the battery 50 needs to chilled in higher ambients when cooling by the radiator 122 is insufficient. Alternatively, the battery 50 needs to be heated using the heating element 116 when the vehicle is plugged in. When the battery loop 110 is isolated, the radiator 122 does not affect the battery loop 110. The radiator 122 can, however, affect the motor loop 120 if opened to direct flow in the direction A.

Figure 7:
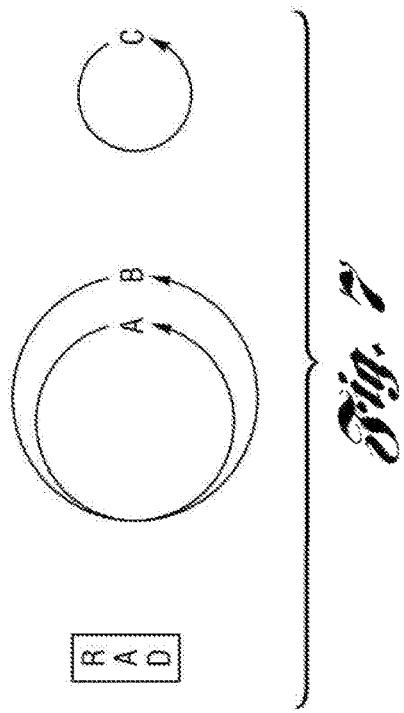
FIG. 7 is a simplified schematic of the thermal management system of FIG. 2 and another operating mode according to an embodiment of the present disclosure.

Finally, FIG. 7 illustrates another configuration of the thermal management system 100 with the battery thermal loop 110 and the motor loop 120 connected in parallel when the battery valve 132 is set to the first position to direct flow in direction C. In this warming mode, the cabin loop 130 is isolated when cabin valve 140 is set to the second position to direct flow in the direction E. Unlike the radiator cooling mode shown in FIGS. 2 and 3, the radiator valve 126 is set to the second position to bypass the radiator 122 and direct flow in the direction B. In this warming mode, the battery 50 and the battery thermal loop 110 may be warmed with waste heat from the motor loop 120 when the ambient temperature is below a threshold temperature when it is cold out and the vehicle is driving. The warming mode will heat up the cold battery 50. The cabin loop 130 runs at a much higher temperature than the battery loop 110 nominally, so the cabin loop 130 needs to be isolated. Eventually, the motor loop 120 may get too hot for the battery 50 and this may again drive isolation of the battery loop 110 with the cabin loop 110 being too hot, as discussed above.

In another embodiment of the disclosure, it is also contemplated that the cabin loop 130 may be permanently isolated from the battery thermal loop 110 and the motor loop 120. This may eliminate the valve 140 and other piping for cost and weight savings as well as simplifying the cabin conditioning controls.

FIG. 8 is a chart summarizing the operating modes of the thermal management system based on the various positions of the radiator valve 126, the battery valve 132 and the cabin valve 140.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A thermal management system for a vehicle comprising:
    a traction battery for propelling the vehicle;
    a motor coupled to the traction battery;
    a first cooling loop circulating fluid to cool the traction battery; and
    a second cooling loop circulating fluid to cool the traction motor;
    a third loop for regulating a passenger cabin temperature and selectively coupled to the first and second cooling loops; and
    a radiator selectively in communication with the first cooling loop and second cooling loop,
    wherein the first loop, the second loop are in fluid communication and arranged in parallel to be cooled by the radiator,
    a radiator valve for selectively controlling fluid flow through the radiator, wherein in a first position fluid flows through the radiator and in a second position fluid bypasses the radiator,
    a battery valve for selectively controlling fluid flow through the traction battery,
    wherein when the radiator valve is in a first position, fluid flows through the radiator and when the battery valve is in a first position fluid flows in parallel through the first loop and the second loop, the radiator thereby cooling the battery and the traction motor in parallel.

2. The thermal management system of claim 1, wherein the first loop and second loop are arranged to circulate in parallel.

3. The thermal management system of claim 1 further comprising a chiller adapted to cool fluid in the first loop, wherein the battery is cooled by the radiator without the chiller when the radiator valve is in the first position and the battery valve is in the first position.

4. The thermal management system of claim 3 further comprising a controller operatively connected to the radiator valve and the battery valve,
    wherein the controller is configured to command the radiator valve and the battery valve to the first positions, respectively to cool the traction the traction battery without the chiller, and if a battery temperature exceeds a threshold temperature, the controller is configured to command the battery valve to the second position and activate the chiller.

5. The thermal management system of claim 4 wherein if a battery temperature is below a threshold temperature the controller commands the radiator valve to a second position to bypass the radiator and warms the battery through the second loop.

6. The thermal management system of claim 1 wherein when the battery valve is in a second position, the first loop is substantially isolated from the second loop and the radiator.

7. The thermal management system of claim 1 further comprising:
   a second loop pump positioned to selectively circulate fluid through the second loop; and
   a first loop pump position to selectively circulate fluid through the first loop,
   wherein the second loop pump and first loop pump are arranged in parallel.

8. The thermal management system of claim 1 wherein a radiator outlet is arranged in series with a first loop inlet, and wherein a second loop inlet is arranged in parallel to the first loop inlet.

9. The thermal management system of claim 1, further comprising:
   a third valve for selectively coupling the third loop to the thermal management system.

10. The electric vehicle thermal management system of claim 1, wherein if a battery temperature is below a threshold temperature the controller commands the radiator valve to a second position to bypass the radiator and warms the battery through the second loop.

11. The electric vehicle thermal management system of claim 1, further comprising:
   a cabin valve for selectively coupling the third loop to the thermal management system,
   wherein the third loop is connected in series with the second loop.

* * * * *